Sept. 14, 1926.
F. AMMON
SEAT ADJUSTER
Filed April 19, 1926
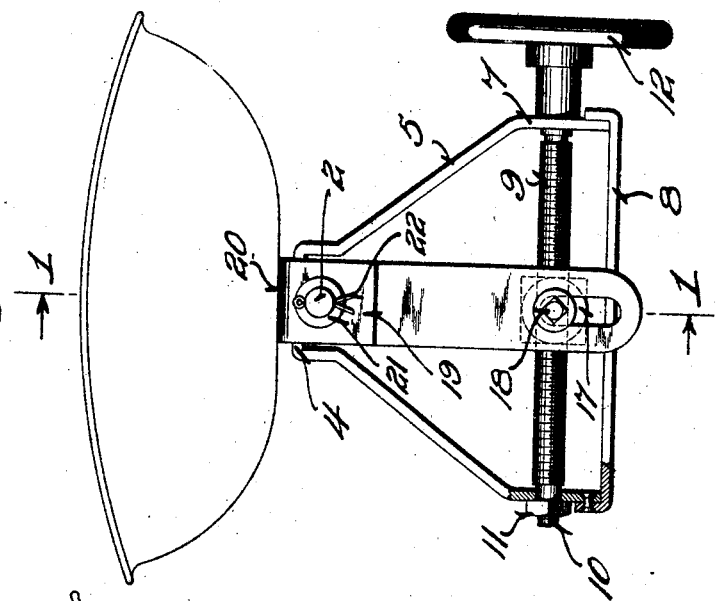
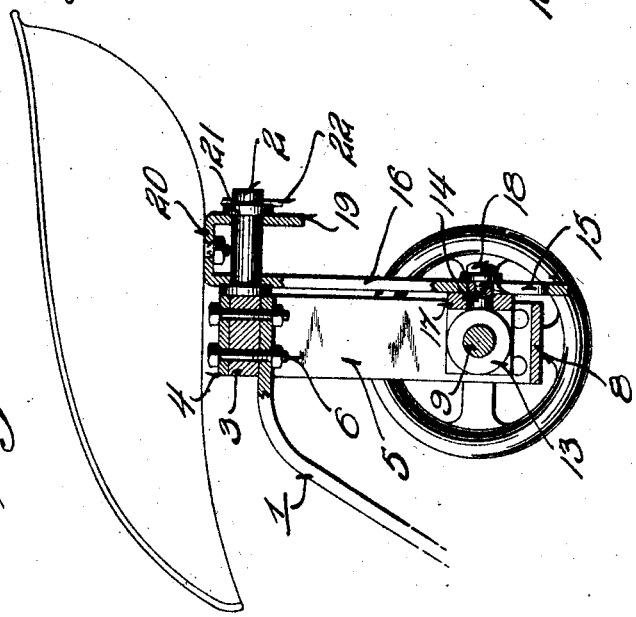
Inventor!
Fred Ammon Patented Sept. 14, 1926.

1,599,941

UNITED STATES PATENT OFFICE.

FRED AMMON, OF WAUKEGAN, ILLINOIS.

SEAT ADJUSTER.

Application filed April 19, 1926. Serial No. 102,938.

This invention relates to seat adjusters, and is particularly directed to a seat adjuster for tractors.

In operating tractors, it is frequently the case that the tractor works upon a slanting hillside with consequent discomfort to the operator.

This invention is designed to provide a seat adjuster which is so constructed that the operator may readily adjust the angle of the seat with reference to the tractor while remaining in the seat so that the utmost comfort and ease of operation is attained.

Seat adjusters have been heretofore made, but these devices usually present difficulties due to their complicated nature or else primarily due to the fact that they raise the seat a material distance upwardly above its normal position as they are attached to the usual supporting bars found on tractors. This invention, however, is designed to provide a seat adjuster which is so constructed that it may be readily attached to the usual supporting bar of tractors and which will not elevate the seat materially above its conventional or normal position, but on the other hand, maintains the normal position of the seat while providing an adjusting mechanism below the supporting bar.

An embodiment of the invention is shown in the accompanying drawings, in which:—

Figure 1 is a sectional view approximately on the line 1—1 of Figure 2.

Figure 2 is a rear view of the device.

Referring to the drawings, it will be seen that the usual tractor supporting bar is indicated by the reference character 1. This bar is provided with apertures through which bolts normally pass to attach the seat.

The device consists of a supporting pin 2 which is provided with a flattened apertured portion 3 resting on the horizontal part of the supporting bar 1. This flat portion receives the yoke 4 of a pair of diverging arms 5. Bolts 6 are passed through the yoke, the flattened portion 3 and the bar 1, as shown in Figure 1, and thus securely attach all of the parts in place. The diverging arms 5 are provided with vertical portions 7 which are preferably joined by means of a brace strap 8 riveted to the lower ends of the vertical portions. These vertical portions provide bearings for an elongated screw 9, such screw being preferably provided with a reduced threaded extension 10 upon which a nut 11 is screwed. The other end of the screw is provided with a hand wheel 12 by means of which the screw may be rotated.

A threaded block or nut 13 cooperates with the screw and is provided with an outwardly projecting pin 14. This pin works within a slot 15 of a lever 16. Preferably, a washer 17 is interposed between the lever 16 and the block 13. A bolt or cap screw 18 screws into the pin 14, and is preferably provided with a washer as shown.

The lever 16 is formed of strap metal, and is provided with a short downwardly extending arm 19 as shown in both figures. This arm is apertured and receives the supporting pin 2. The yoke portion 20 is bolted to the bottom of the seat as indicated.. Preferably, a washer 21 and a split pin 22 are employed for retaining the lever on the pin 2.

It will be seen that the normal position of the seat has scarcely been altered when this construction is employed, but that the seat remains at approximately its original height. This is secured by placing the controlling or adjusting mechanism below the bar as described above in detail.

It is to be noted further that the construction is such that the utmost rigidity of the parts is secured together with the utmost strength. In addition to this, the weight of the seat is carried by the projecting pin 2 while the stresses imparted to the screw 9 are transmitted to the frame or arms 5, and thence to the supporting bar 1, thus a very secure and reliable construction is attained, and one which may be readily and cheaply produced.

Although the invention has been described in considerable detail, such invention is intended as illustrative rather than limiting as the invention may be variously embodied and as the scope of such invention is to be determined as claimed.

I claim:

1. The combination of a supporting bar, a supporting pin having a flattened portion resting upon said supporting bar and having a cylindrical outwardly projecting portion, a pair of diverging arms resting on the flattened portion of said pin, fasteners securing the flattened portion of said pin, the adjacent portion of said arms and the supporting bar rigidly together, an elongated screw journaled in the diverging arms, a nut carried by said screw, a U-shaped lever journaled upon the cylindrical portion of said pin and having a slot and pin connection with said nut, and a seat bolted to said U-shaped lever.

2. The combination of a tractor seat-supporting bar and a seat adjuster, said seat adjuster comprising a supporting pin and a frame work bolted to said supporting bar, a lever having a pair of parallel arms journaled upon said pin, a seat bolted to said lever, said lever having a slotted lower end, an elongated screw journaled in said frame, a nut threaded upon said screw and having a projecting pin fitted within the slot of said lever, and a hand wheel rigidly carried by the one end of said screw.

In testimony that I claim the foregoing I have hereunto set my hand at Waukegan, in the county of Lake and State of Illinois.

FRED AMMON.